United States Patent
Appel et al.

(10) Patent No.: US 11,269,596 B2
(45) Date of Patent: Mar. 8, 2022

(54) AUTOMATED MICROSERVICE CREATION BASED ON USER INTERACTION

(71) Applicant: INTERNATIONAL BUSINESS MACHINES CORPORATION, Armonk, NY (US)

(72) Inventors: Ana Paula Appel, São Paulo (BR); Renato Luiz De Freitas Cunha, São Paulo (BR); Eduardo Rocha Rodrigues, São Paulo (BR); Bruno Silva, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 16/447,295

(22) Filed: Jun. 20, 2019

(65) Prior Publication Data

US 2020/0401379 A1    Dec. 24, 2020

(51) Int. Cl.
    *G06F 8/33*     (2018.01)
    *G06F 8/30*     (2018.01)
    *G06F 9/54*     (2006.01)
    *G06F 8/73*     (2018.01)
    *G06F 11/36*    (2006.01)

(52) U.S. Cl.
    CPC .............. *G06F 8/33* (2013.01); *G06F 8/315* (2013.01); *G06F 8/73* (2013.01); *G06F 9/545* (2013.01); *G06F 11/3664* (2013.01)

(58) Field of Classification Search
    CPC .......... G06F 8/33; G06F 8/65–70; G06F 8/73; G06F 8/315; G06F 9/545; G06F 11/3664
    See application file for complete search history.

(56) References Cited

U.S. PATENT DOCUMENTS 7,500,222 B2   3/2009 Bates et al.
8,281,307 B2   10/2012 Arnold et al.
(Continued)

FOREIGN PATENT DOCUMENTS

CN   104991815 A   10/2015
CN   106873975 A   6/2017
(Continued)

OTHER PUBLICATIONS

Vindeep Singh et al., "Container-based Microservice Architecture for Cloud Applications", [Online], pp. 847-852, [Retrieved from Internet on Dec. 17, 2017], <https://ieeexplore.ieee.org/stamp/stamp.jsp?tp=&arnumber=8229914> (Year: 2017).*

(Continued)

*Primary Examiner* — Ziaul A Chowdhury
(74) *Attorney, Agent, or Firm* — Stephen R. Yoder (57) ABSTRACT

A microservice and the recipe for that microservice are automatically created by modifying a local environment in an integrated development environment executing on a computing system to construct a desired microservice, recording commands entered while modifying the local environment, computing a list of changes from the recorded commands that change the local environment and compiling the list of changes into a recipe comprising commands and dependencies sufficient to assemble an operating system and software files that are sufficient to instantiate the desired microservice.

11 Claims, 6 Drawing Sheets

(56) References Cited

U.S. PATENT DOCUMENTS

| | | |
|---|---|---|
| 9,940,219 B2 | 4/2018 | Bigwood et al. |
| 10,055,200 B1* | 8/2018 | Russell ............... G06F 11/3696 |
| 10,656,929 B2* | 5/2020 | Jamjoom ............ G06F 11/3612 |
| 10,680,918 B1* | 6/2020 | Mazzitelli ............... G06F 9/451 |
| 10,684,940 B1* | 6/2020 | Kayal .................. G06F 11/3664 |
| 2004/0153994 A1 | 8/2004 | Bates et al. |
| 2010/0306772 A1 | 12/2010 | Arnold et al. |
| 2016/0124742 A1* | 5/2016 | Rangasamy ........ H04L 41/0803 |
| | | 717/103 |
| 2016/0357659 A1 | 12/2016 | Bigwood et al. |
| 2018/0088935 A1 | 3/2018 | Church et al. |
| 2018/0113705 A1 | 4/2018 | Webb et al. |
| 2018/0189054 A1 | 7/2018 | Kalidindi |
| 2018/0238575 A1* | 8/2018 | Park ........................ F24F 11/54 |
| 2018/0260244 A1 | 9/2018 | Ahmed et al. |
| 2019/0034249 A1* | 1/2019 | Bean ........................ G06F 9/48 |
| 2019/0339948 A1* | 11/2019 | Metwally .................. G06F 8/73 |
| 2020/0241912 A1* | 7/2020 | Bailey ....................... G06F 8/31 |
| 2020/0357047 A1* | 11/2020 | Stevenson .......... G06Q 30/0275 |

FOREIGN PATENT DOCUMENTS

| | | |
|---|---|---|
| CN | 108897527 A | 11/2018 |
| CN | 108920365 A | 11/2018 |

OTHER PUBLICATIONS

Sander Klock et al., "Workload-based Clustering of Coherent Feature Sets in Microservice Architectures", [Online], pp. 11-20, [Retrieved from Internet on Dec. 17, 2021], <https://ieeexplore.ieee.org/stamp/stamp.jsp?arnumber=7930194>, (Year: 2017).*

David Jaramillo et al., "Leveraging microservices architecture by using Docker technology", [Online], pp. 1-5, [Retrieved from Internet on Dec. 17, 2021], <https://ieeexplore.ieee.org/stamp/stamp.jsp?arnumber=7506647>, (Year: 2016).*

Benni et al.,"Supporting Micro-services Deployment in a Safer Way: a Static Analysis and Automated Rewriting Approach," Proceedings of the 33rd Annual ACM Symposium on Applied Computing (SAC'18), Apr. 9-13, 2018, pp. 1705-1715, Pau, FR.

* cited by examiner

302 — Project files:
```
.. (up a dir)
/Users/renatoc/
▼ chimera/
    ▶ __pycache__
      __init__.py
      chimera.py
    ▶ data/
    ▶ doc/
    ▶ tests/
      chimera.zip
      labels.txt
      manifest.yml
      pytest.ini
      README.md
      requirements
      run-wml.sh*
      setup.py
      submit-wml.sh
```

304 — Shell recording programmer commands:
```
mithril ≈ repos/chimera/chimera <master*> % python3 -m venv tmp
mithril ≈ repos/chimera/chimera <master*> % source tmp/bin/activate
(tmp) mithril ≈ repos/chimera/chimera <master*> % pip install -q tensorflow
```

306:
```
<oc@mithril ~repos/chimera/chimera]                 1,1       All  Thu Feb 14 15:42
M = A_t.shape[-1] # A's colums
D = C_t.shape[-1] # C's colums logging.debug(
    'k = %d, steps = %d, alpha = %g, beta = %g, lamda1 = %g, lamda2 = '
    '%g, K, steps, alpha, beta, lamda1, lamda2
)

+-- 36 lines: Variable definition---------------------------------------------- lr = tf.placeholder(tf.float32, name='learning_rate')

+-- 10 lines: Matirx multiplication-------------------------------------------

+-- 8 lines: Error between approximations and true values--------------------

+-- 15 lines: Losses--------------------------------------------------------- optimizer = tf.train.AdmOptimizer(lr).minimize(loss, var_list=[tUs, tV, tw])

optimizer = tf.train.GradientDecentOptimizer(lr).minimize(loss, var_list=[tUs, tV, tW])

+-- 9 lines: Clip to yield non-negative factorization----------------------- if logdir:
        writer = tf.summary.FileWriter(logdir, graph=tf.get_default_graph())
    else:
        writer = None tf.summary.scalar("loss", loss)
    tf.summary.scalar('A_loss', tf.reduce_sum(tA_loss))
    tf.summary.scalar("C_loss", tf.reduce_sum(tC_loss))
    tf.summary.scalar("reg1", reg1)
<repos/chimera, chimera.py>                     151,564%     Thu Feb 14 15:42
```

AUTOMATED MICROSERVICE CREATION BASED ON USER INTERACTION

FIELD OF THE INVENTION

The present invention relates to microservices.

BACKGROUND OF THE INVENTION

Practitioners of software development and information technology operations (DevOps) methodologies take part both in the development of applications and in the definition of microservices for execution of applications. These microservices can be deployed on the cloud and are provisioned with recipes for creation of virtualized environments. Due to the nature of the development cycle, developers tend to test many different configurations on their personal development computers prior to writing a definitive version of the recipe. However, developers may forget how their systems were configured and may have to learn how to write their microservice creation recipes. Therefore, systems and methods are desired to assist developers in generating microservice recipes.

SUMMARY OF THE INVENTION

Exemplary embodiments are directed to systems and methods that automatically monitor the actions of a developer while changing or modifying a local environment and generate microservice creation recipes from the monitored actions or steps. The developer or programmer, using a development computer interacts with a shell in a given integrated development environment (IDE). The IDE includes a change recorder that records programmer interaction with the local environment and that automatically computes changes to the local environment. The IDE also includes a recipe generator to generate or compile microservice creation recipes for replicating the local environment automatically based on the computed changes. The system compiles a representation of the recipe to target a given virtualized infrastructure, such as Docker. For docker, the compiled recipe is a Dockerfile. Merely recording all the changes performed by the programmer to the file system is usually not enough to yield a valid recipe. For example, the user code may have to access a server process that uses a client-server architecture within the container where the microservice is run. In this case, for successful execution of the microservice, the generated recipe needs to open the ports on which the server process listens. Therefore, if the server process is executed within the local environment created by the IDE, the local environment manager of the IDE is able to inspect the child processes started in this environment, gathering information of open ports required by the server software. With this, the recipe can include directives for opening the ports needed by the server software. In addition, cloud software can be used to verify whether the generated recipe for the microservice works automatically by instantiating and executing the microservice. In one embodiment, a unit test suite is used to determine validity of configuration.

The recorded changes to the local environment and the compiled recipe are compressed to create more compact layers and remove unnecessary or unused files, services and packages or libraries. In one embodiment, similar changes are grouped to reduce the size of layered images. For example, writing a recipe that includes "pip install scikit-learn" followed by "pip install tensorflow" creates two layers, whereas "pip install scikit-learn tensorflow" creates just a single layer with the same content. In addition, the system uses a test suite to check which files, additional microservices and packages or libraries are touched during execution of the microservice, i.e., are touched by the user code. In one embodiment, the test suite traces system calls made during execution. The recipe is compressed by leaving only files, services and packages that are actually used. However, this test must actually test the relevant portions of the tested code of the microservice. Therefore, compression is performed only if the test covers a threshold for the lines of code that are considered in the test, e.g., at least about 80%. If the threshold number of lines of code are not considered, the recipe is generated without further compression.

Exemplary embodiments are directed to a method for microservice creation. A local environment in an integrated development environment executing on a computing system is modified to construct a desired microservice, and commands entered while modifying the local environment are recorded. A list of changes is computed from the recorded commands. The list of changes includes commands that change the local environment. The list of changes is compiled into a recipe containing commands and dependencies sufficient to assemble an operating system and software files that are sufficient to instantiate the desired microservice.

Exemplary embodiments are also directed to a computer-readable medium containing a computer-readable code that when read by a computer causes the computer to perform a method for microservice creation. A local environment in an integrated development environment executing on a computing system is modified to construct a desired microservice, and commands entered while modifying the local environment are recorded. A list of changes is computed from the recorded commands. The list of changes includes commands that change the local environment. The list of changes is compiled into a recipe containing commands and dependencies sufficient to assemble an operating system and software files that are sufficient to instantiate the desired microservice.

Exemplary embodiments are directed to a system for automated microservice creation. The system includes an integrated development environment executing on a computing system. The integrated development environment includes a local environment manager to manage local environments for development within the integrated development environment, an integrated local environment shell in communication with the local environment manager and a development computer to facilitate modification of a given local environment to construct a desired microservice and a change recorder in communication with the integrated local environment shell to record commands entered while modifying the given local environment and to compute a list of changes from the recorded commands. The list of changes includes commands that change the given local environment. The integrated development environment also includes a recipe generator in communication with the change recorder to compile the list of changes into a recipe containing commands and dependencies sufficient to assemble an operating system and software files that are sufficient to instantiate the desired microservice.

DETAILED DESCRIPTION

Exemplary embodiments are directed to systems and methods that automatically create recipes for microservices using the recorded actions of a programmer or DevOps practitioner. A programmer or DevOps practitioner develops software on their local development computer using an IDE that is running on one or more computing systems. The IDE includes a local environment manager to manage virtual development environments for the programmer or practitioner. In one embodiment, the local environment manager manages at least one local environment for each project on which the programmer or practitioner is working. The IDE also includes an IDE shell, and the programmer or practitioner interacts with the local environment created by the IDE by using the IDE shell. Using the IDE shell, the programmer or practitioner can enter commands and perform any desired actions on files. Suitable actions include, but are not limited to, creating files, deleting files, copying files and moving files. As used herein, files include any stored content that is used as part of the desired microservice. These files include, for example, a constants file, a credential file and any resource file that can be used by the microservice.

Every change made, e.g., action taken or command entered, by the programmer or practitioner in the shell is recorded using a change recorder provided in the IDE. From these recorded changes, a set of operations are abstracted to transfer the local environment from an original state to the final state created by the programmer or practitioner. The system includes a command translation database that is located within the IDE, is accessible to the IDE though one or more local or wide area networks, i.e., a cloud-based database, or both. The command translation database includes mappings between commands typed in the shell to recipe components of one or more microservice automation technologies. Suitable microservice automation technologies include, but are not limited to, Ansible, Docker, UniK, and CoreOS rkt.

The IDE includes a recipe generator that is in communication with the command translation database and the change recorder. After recording of the changes is completed, the recipe generator uses the command translation database to translate the recorded changes to the target microservice provisioning implementation, i.e., to generate a recipe. When the code created by the programmer or practitioner includes a test suite, the test suite is used to check that tests pass in the microservice created by the recipe and to check which files, services and packages are actually used or touched by the microservice. As used herein, service refers to any other or additional microservice or server software that uses a client-server architecture that is referenced in the desired microservice generated by the programmer or practitioner, e.g., database server system, object storage or message queue broker, and that was defined to be used during execution of the desired microservice. A package or library, depending on the programming language used, corresponds to any third-party software used by the desired microservice.

The IDE includes a change compressor that receives the results from the test suite and compress the image created by the recipe by removing files, services and packages that are not actually touched by the desired microservice during execution. In one embodiment, the image is compressed only if the test achieves a desired or pre-defined level of test coverage. Test coverage measures the percentage of lines of code used to execute the microservice accessed by a test suite. In one embodiment, the threshold is at least about 80%.

Figure 1:
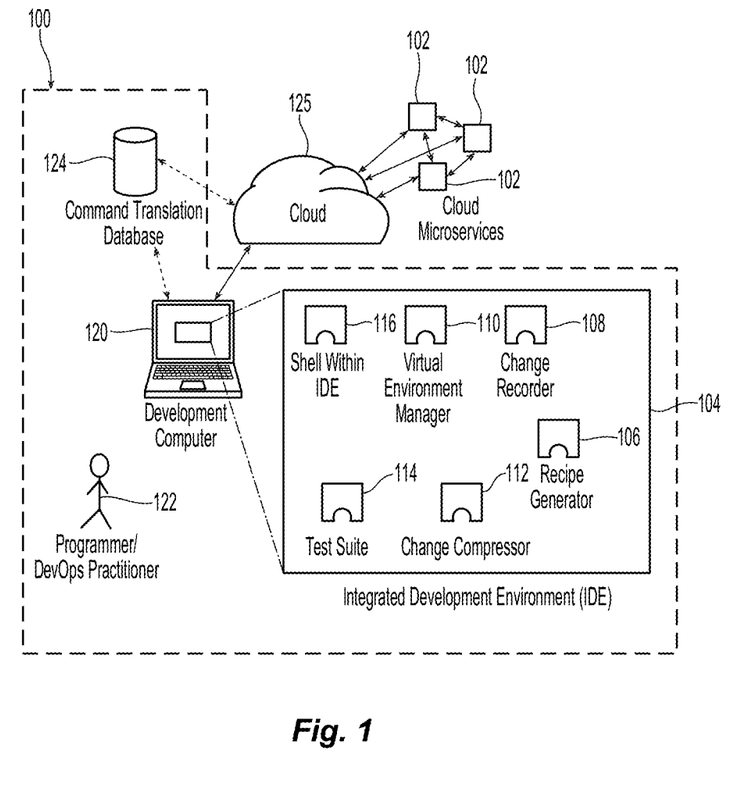
FIG. 1 is a schematic representation of an embodiment of a system for automated microservice creation based on user interaction.

Referring initially to FIG. 1, exemplary embodiments include a system 100 for automated creation of microservices 102. Microservices are used to structure a given application as a collection of separate services, each service provided by one of the microservices. The microservices include cloud-based microservices. The system includes an integrated development environment 104 (IDE) executing on a computing system. Examples of IDEs include, but are not limited to, Rational Application Developer, Eclipse, IntelliJ Idea, and Visual Studio. The IDE includes a local environment manager 110 to manage local environments for development within the IDE. An integrated local environment shell 116 is provided in communication with the local environment manager and a development computer 120 contained within the system and associated with a given programmer or practitioner 122. The IDE shell provides the local environment to the programmer or practitioner to facilitate modification of a given local environment to construct a desired microservice.

Figure 5:
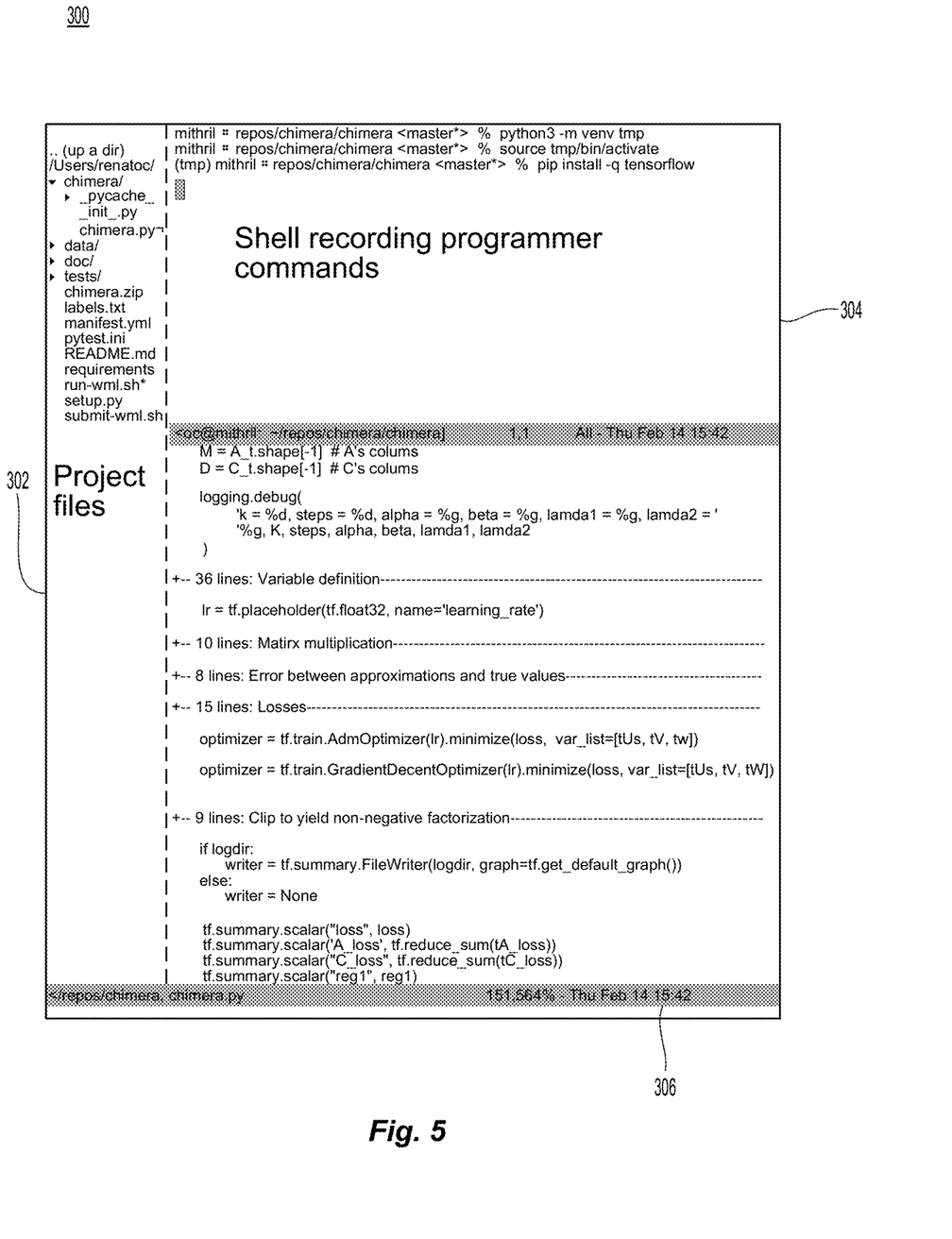
FIG. 5 is an illustration of an embodiment of a local environment provided to the programmer by the IDE shell.

The IDE includes a change recorder 108 in communication with the integrated local environment shell to record commands or changes entered by the programmer or practitioner while modifying the given local environment. The change recorder also computes a list of changes from the recorded commands. The list of changes includes those commands that change the given local environment. Therefore, commands entered, or actions taken that do not result in an actual change to the local environment are not included in the list of changes. Referring to FIG. 5, an embodiment of the local environment 300 provided to the programmer or practitioner by the IDE shell is illustrated. The local environment provides a code editing section 306 that is used by the programmer or practitioner to make the desired changes and enter commands into the local environment. A list of project files 302 available for editing are also provided. The shell also displays a list of the commands being recorded 304.

Figure 6:
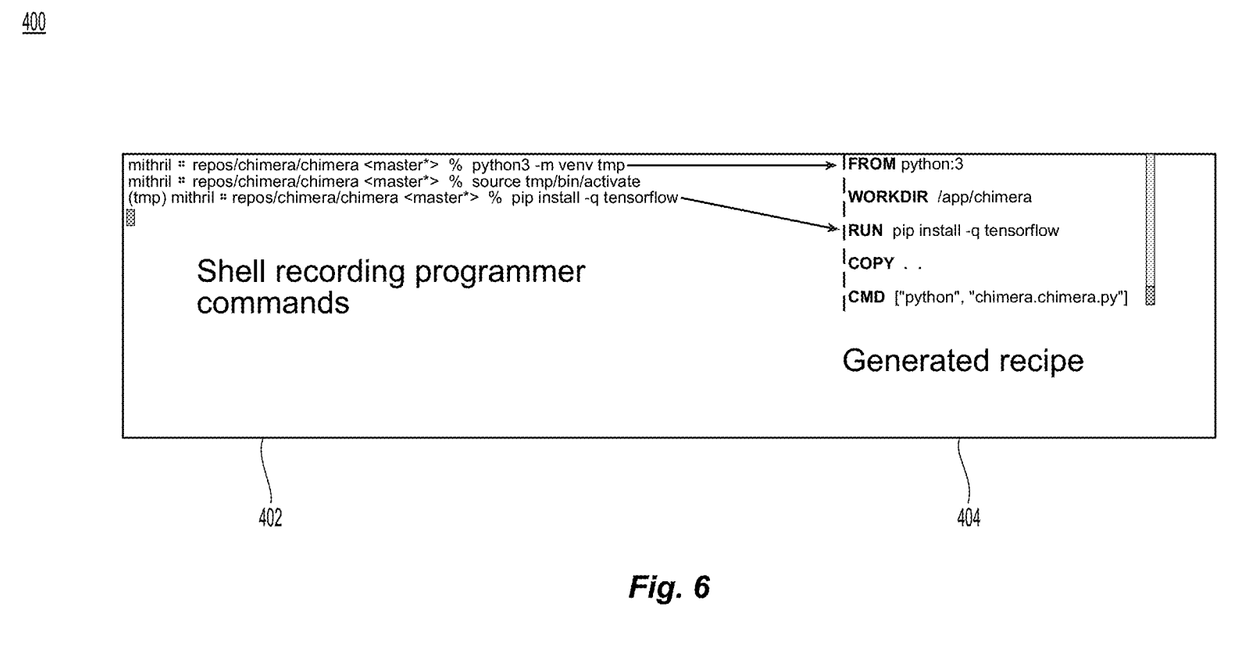
FIG. 6 is an illustration of an embodiment of a recipe generator provided to the programmer by the IDE shell.

Returning to FIG. 1, the IDE includes a recipe generator 106 in communication with the change recorder to compile the list of changes into a recipe. The recipe includes commands and dependencies sufficient to assemble an operating system and software files that are sufficient to instantiate the desired microservice. In Docker, for example, the recipe is a Dockerfile, which includes the instructions, commands and dependencies required to create a docker image. A docker image is a file system image that contains the programs and data files. The Docker system usually makes use of functionality provided by the Linux kernel, e.g. namespaces and cgroups, to isolate different microservices running in the same host. A container is an instance of this image (operating system and programs) executing in given infrastructure, e.g., a cloud. Multiple containers can be instantiated from the same image. A microservice instance corresponds to a running container that was created, for example, from the docker image, and the docker image was generated by the corresponding Dockerfile, i.e., recipe. Therefore, the Dockerfile or recipe can be used to create an image that is used to start one or more microservice instances. Consequently, just the Dockerfile or recipe is needed to instantiate one or more instances of a microservice in a given infrastructure. Referring to FIG. 6, the IDE shell provides a recipe generation display 400 to the user that includes the recorded commands 402 and the recipe that is generated using those commands 404.

Returning to FIG. 1, the system also includes at least one command translation database 124 in communication with the recipe generator. The command translation database can be contained within the IDE, can be in communication with the IDE across the cloud 125 or both. The command translation database stores mappings between recorded commands in the list of changes that access files within the integrated development environment and file paths in a target microservice provisioning environment that correspond to the files within the integrated development environment. Therefore, the recipe can be used to produce an image that accesses files, services and packages within a desired execution environment and not just within the IDE.

The IDE also includes functionality to execute a test suite 114 provided by the programmer or practitioner in communication with the recipe generator to test operation of the desired microservice and to determine files, additional microservices (services) and third-party software (packages) used during execution of the desired microservice. The test suite execution functionality of the IDE also determines a percentage of lines of code used to execute the desired microservice that are analyzed to determine the files, additional microservices and third-party software used during execution of the desired microservice. The IDE includes a change compressor 112. The change compressor compresses the computed list of changes and the recipe by identifying groups of common or related commands and expressing each group of common commands as a single command in the list of changes. Therefore, the number of lines or layers in the compiled list or recipe are reduced. In addition, commands are removed from the recipe that are associated with files, additional microservices and third-party software that are not used during execution of the desired microservice. In one embodiment, commands are removed only when a pre-determined percentage of lines of code used to execute the desired microservice are analyzed to determine the files, additional microservices and third-party software used during execution of the desired microservice. In one embodiment, this pre-determined and programmer defined percentage is at least about 80%.

In general, the system records changes to the local environment, and upon completion of the recording process, the system goes through the resulting set of changes performed by the programmer or practitioner to compute what files were touched, written, created and deleted in the new local environment. As the programmer or practitioner may have performed an inefficient set of changes while creating the new local environment and since instances of the microservice or image containers tend to have layered filesystems, some sets of changes are grouped to create more compact layers and avoid waste and unnecessary intermediate layers. For example, writing a recipe that includes "pip install scikit-learn" followed by "pip install tensor-Flow" will create two layers, while "pip install scikit-learn tensor-Flow" creates just a single layer with the same content. Therefore, the list of changes is reviewed, and commands are grouped, reducing the number of layers.

Using the list of changes or commands, the recipe is compiled for the desired replicating environment. In one embodiment, the compressed set of changes is used to compile a representation of the learned recipe to target a virtualized infrastructure, e.g., Docker. A test suite is used to check which files, packages and services are touched. Even though a first round of compression was performed, an available test suite is used to check which components of installed packages are actually used by the microservice. For example, the files and services that are touched by the user code are checked by tracing system calls made during execution. Based on this testing, the recipe is further compressed by leaving only files, services and packages that are actually used. However, this compression is performed with confidence only if there is high test coverage for the system. Therefore, in one embodiment, compression only proceeds if test coverage passes a threshold set by the programmer or practitioner. Otherwise, a recipe is generated without further compression beyond reducing the number of layers.

Figure 2:
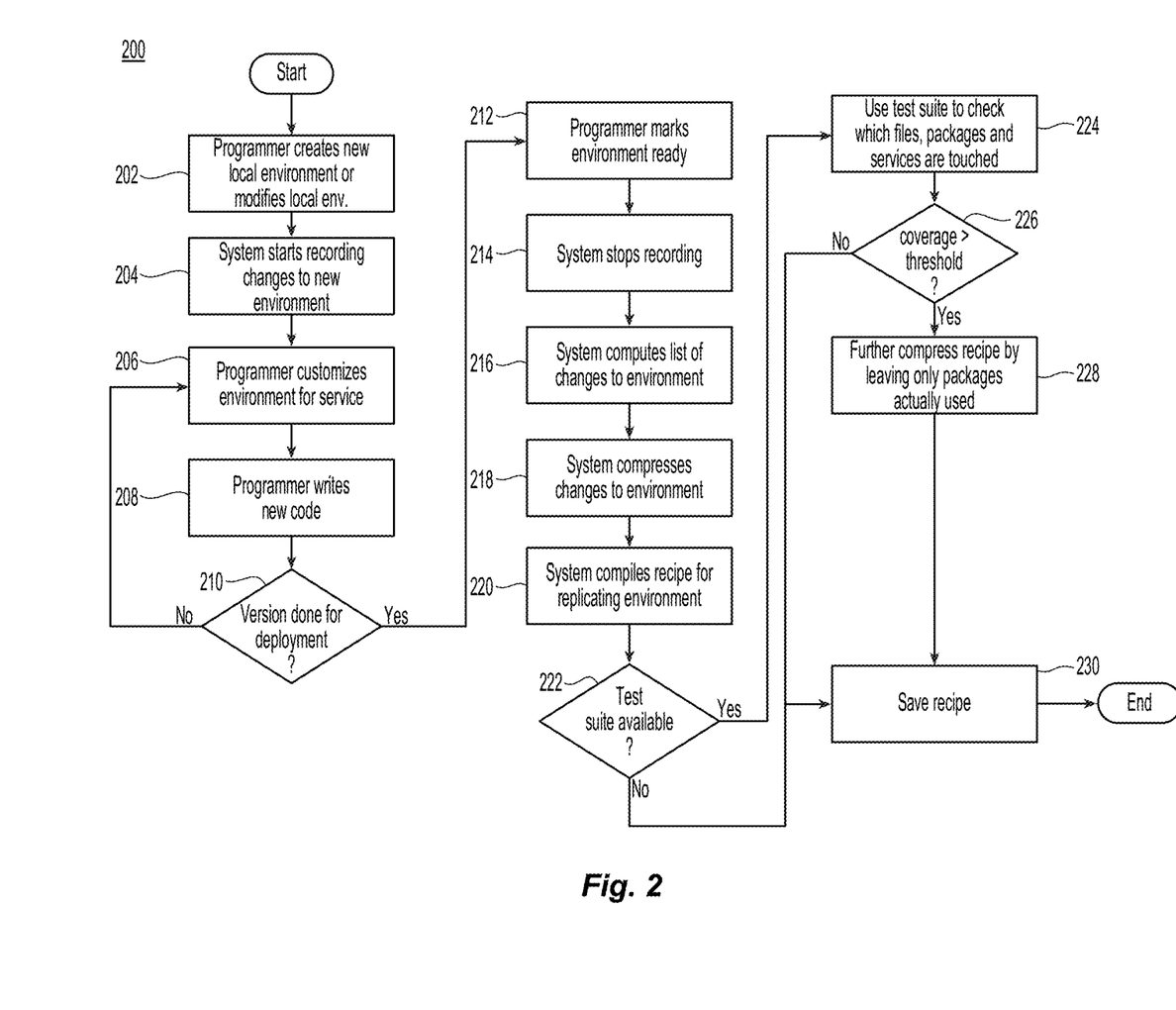
FIG. 2 is a flow chart illustrating an embodiment of a method for automated microservice creation based on user interaction.

Referring now to FIG. 2, exemplary embodiments include a method for microservice creation 200. A programmer or practitioner modifies a local environment 202 in and created by an integrated development environment executing on a computing system to construct a desired microservice. In one embodiment, modifying the local environment includes modifying an existing local environment corresponding to an existing microservice, and the desired microservice is a modification of the existing microservice. Alternatively, modifying the local environment includes creating a new local environment corresponding to a new microservice, and the desired microservice is the new microservice.

Commands entered while modifying the local environment are recorded while the practitioner or programmer is modifying the local environment. Therefore, recording of the changes to the local environment, e.g., commands and actions entered, is initiated 204. The practitioner customizes the local environment in accordance with the desired microservice and writes new code 208 as needed. A determination is made by the programmer or practitioner regarding whether the current version of the local environment is ready for deployment as a microservice 210. If not, the practitioner continues to customize the local environment in accordance with the desired microservice and to write new code. Once the programmer or practitioner determines that the modified local environment is ready for deployment, the programmer or practitioner marks or otherwise indicates that the local environment is ready for deployment 212. Recording is then stopped 214.

A list of changes is computed from the recorded commands 216. The list of changes includes commands that change the local environment. In one embodiment, the list of changes includes only those commands that change the local environment. In one embodiment, recorded commands that do not change the local environment are removed from the list of changes. The computed list of changes is then compressed 216. In one embodiment, groups of common or related commands are identified, and each group of common commands is expressed as a single command in the list of changes.

The list of changes is compiled into a recipe 220 for a given replicating environment. The recipe includes commands and dependencies sufficient to assemble an operating system and software files that are sufficient to instantiate the desired microservice. As the recorded commands perform actions on files accessed within the integrated development environment, compiling the list of changes into the recipe includes mapping recorded commands in the list of changes that access files within the integrated development environment to file paths in a target microservice provisioning environment that correspond to the files within the integrated development environment or desired microservice.

Having complied the recipe, a determination is then made regarding whether a test suite is available to test the desired microservice 222. If a test suite is not available, the recipe is saved 230. If a test suite is available, the microservice is instantiated, and the test suite is used to test the microservice and check the files, additional microservices (services) and third-party software (packages) used or touched by the microservice 224. A determination is then made regarding whether or not the coverage of the test exceeds a pre-determined threshold 226. For example, the test is analyzed to determine if a pre-determined percentage of lines of code used to execute the desired microservice were analyzed to determine the files, additional microservices and third-party software used during execution of the desired microservice. If the coverage does not exceed the threshold, the recipe is saved. If the coverage does exceed the threshold, the recipe is further compressed 228 by removing commands from the recipe associated with files, additional microservices and third-party software that are not used during execution of the desired microservice.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, apart from limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 3:
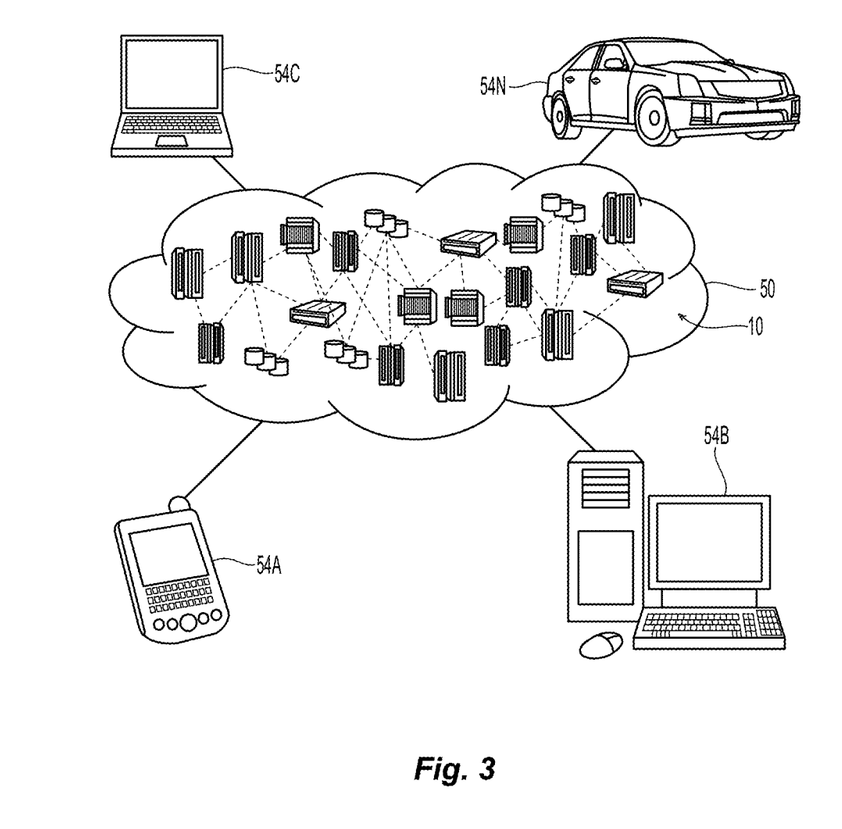
FIG. 3 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 3, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection, e.g., using a web browser.

Figure 4:
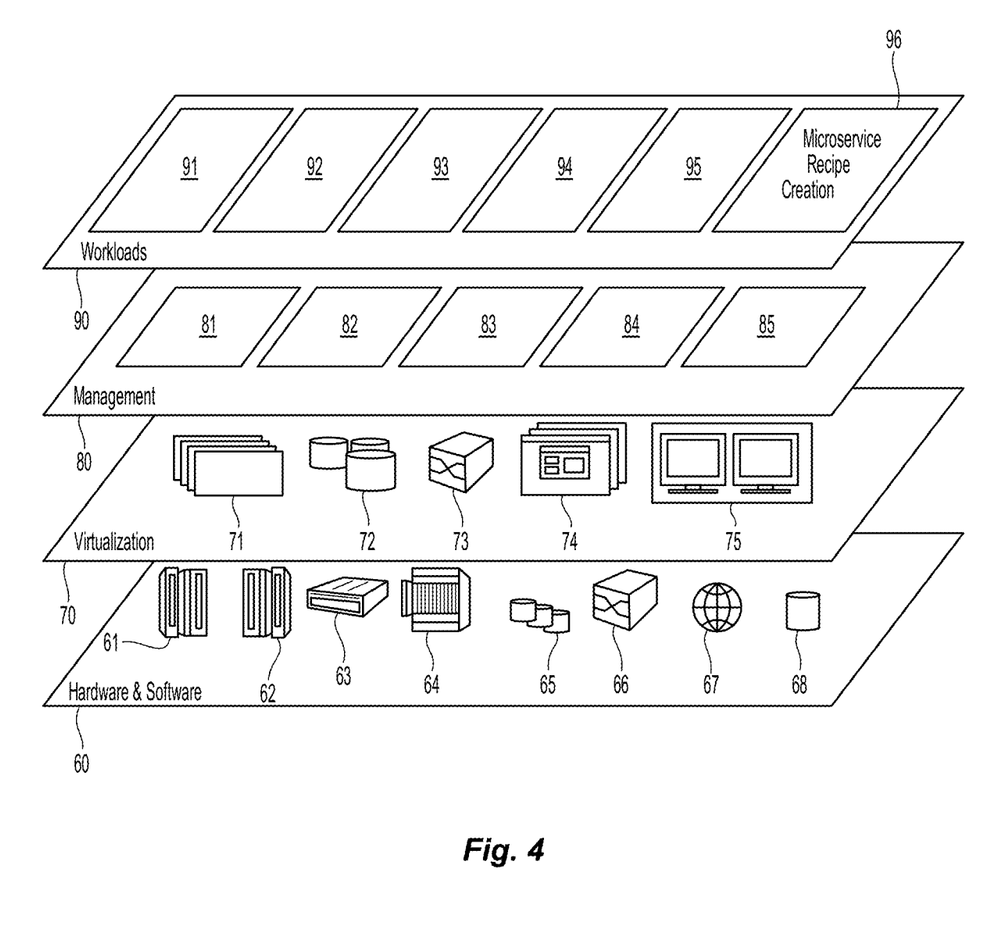
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice recipe creation 96.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for microservice creation, the method comprising:
    modifying a local environment in an integrated development environment executing on a computing system to construct a desired microservice;
    recording commands entered while modifying the local environment;
    computing a list of changes from the recorded commands, with the list of changes including commands that change the local environment;
    compiling the list of changes into a recipe including commands and dependencies sufficient to assemble an operating system and software files that are sufficient to instantiate the desired microservice, with the recipe using a functionality to isolate different microservices from the desired microservice running in a common host, with the functionality to isolate the different microservices including executing a test suite with a recipe generator in order to test the operation of the desired microservice;
    determining files, additional microservices, and third-party software used during execution of the desired microservice;
    determining a percentage of lines of code used to execute the desired microservice according to the determined files, additional microservices, and third-party software used during execution of the desired microservice;
    compressing the list of changes by:
        identifying groups of common commands; and
        expressing each group of common commands as a single command in the list of changes; and
    responsive to a pre-determined percentage of lines of code being met, removing commands from the recipe associated with files, additional microservices, and third-party software that are not used during execution of the desired microservice.

2. The method of claim 1, wherein modifying the local environment includes modifying an existing local environment corresponding to an existing microservice, with the desired microservice including a modification of the existing microservice.

3. The method of claim 1, wherein modifying the local environment includes creating a new local environment corresponding to a new microservice, with the desired microservice including the new microservice.

4. The method of claim 1, wherein the computing system includes a command translation database, with the command translation database being located in an integrated development environment (IDE).

5. The method of claim 1, wherein the functionality to isolate the different microservices further including determining files and additional microservices used during execution of the desired microservice.

6. A computer program product (CPP) comprising:
    a machine-readable storage device; and
    computer code stored on the machine-readable storage device, with the computer code including instructions and data for causing a processor(s) set to perform operations including the following:
        modifying a local environment in an integrated development environment executing on a computing system to construct a desired microservice,
        recording commands entered while modifying the local environment, computing a list of changes from the recorded commands, the list of changes comprising commands that change the local environment, compiling the list of changes into a recipe comprising commands and dependencies sufficient to assemble an operating system and software files that are sufficient to instantiate the desired microservice, with the recipe using a functionality to isolate different microservices from the desired microservice running in a common host, with the functionality to isolate the different microservices including executing a test suite with a recipe generator in order to test the operation of the desired microservice, determining files, additional microservices, and third-party software used during execution of the desired microservice;

determining a percentage of lines of code used to execute the desired microservice according to the determined files, additional microservices, and third-party software used during execution of the desired microservice;

compressing the list of changes by:
 identifying groups of common commands; and
 expressing each group of common commands as a single command in the list of changes; and responsive to a pre-determined percentage of lines of code being met, removing commands from the recipe associated with files, additional microservices, and third-party software that are not used during execution of the desired microservice.

7. The CPP of claim 6, wherein modifying the local environment includes modifying an existing local environment corresponding to an existing microservice, with the desired microservice including a modification of the existing microservice.

8. The CPP of claim 6, wherein modifying the local environment includes creating a new local environment corresponding to a new microservice, with the desired microservice including the new microservice.

9. The CPP of claim 6, wherein the computing system includes a command translation database, with the command translation database being located in an integrated development environment (IDE).

10. The CPP of claim 6, wherein the functionality to isolate the different microservices further including determining files and additional microservices used during execution of the desired microservice.

11. A system for automated microservice creation, the system comprising:
 an integrated development environment executing on a computing system, the integrated development environment comprising:
  a local environment manager to manage local environments for development within the integrated development environment;
  an integrated local environment shell in communication with the local environment manager and a development computer to facilitate modification of a given local environment to construct a desired microservice;
 a change recorder in communication with the integrated local environment shell to record commands entered while modifying the given local environment and to compute a list of changes from the recorded commands, the list of changes comprising commands that change the given local environment; and
 a recipe generator in communication with the change recorder to compile the list of changes into a recipe including commands and dependencies sufficient to assemble an operating system and software files that are sufficient to instantiate the desired microservice, with the recipe using a functionality to isolate different microservices from the desired microservice running in a common host, and with the functionality to isolate the different microservices including executing a test suite with the recipe generator in order to test the operation of the desired microservice;
 a test suite in communication with the recipe generator to determine files, additional microservices, and third-party software used during execution of the desired microservice and to determine a percentage of lines of code used to execute the desired microservice according to the determined files, additional microservices and third-party software used during execution of the desired microservice; and
 a change compressor to compress the list of changes by identifying groups of common commands and expressing each group of common commands as a single command in the list of changes; and
 a command translation database in communication with the recipe generator, the command translation database comprising mappings between recorded commands in the list of changes that access files within the integrated development environment and file paths in a target microservice provisioning environment that correspond to the files within the integrated development environment; and
 responsive to a pre-determined percentage of lines of code being met, removing commands from the recipe associated with files, additional microservices, and third-party software that are not used during execution of the desired microservice.

* * * * *